Oct. 26, 1954  C. A. THOMAS  2,692,577
PARLOR STALL
Filed Oct. 22, 1949  3 Sheets-Sheet 1

Inventor:
Chester A. Thomas,
By Schroeder, Merriam,
Hofgren & Brady, Attys.

Oct. 26, 1954  C. A. THOMAS  2,692,577
PARLOR STALL
Filed Oct. 22, 1949  3 Sheets-Sheet 2

Inventor:
Chester A. Thomas,
By Schroeder, Merriam,
Hofgren & Brady, Attys.

Oct. 26, 1954    C. A. THOMAS    2,692,577
PARLOR STALL

Filed Oct. 22, 1949    3 Sheets-Sheet 3

Inventor:
Chester A. Thomas,
By Schroeder, Merriam,
Hofgren & Brady, Attys.

Patented Oct. 26, 1954

2,692,577

UNITED STATES PATENT OFFICE 2,692,577

PARLOR STALL

Chester A. Thomas, Crystal Lake, Ill., assignor to Babson Bros. Co., a corporation of Illinois Application October 22, 1949, Serial No. 122,999

12 Claims. (Cl. 119—27)

This invention relates to a parlor stall.

This application is a continuation-in-part of my copending application Ser. No. 522,383, filed February 18, 1944, now Patent 2,528,255, issued October 31, 1950.

The present application is primarily concerned with improvements in a milking parlor and stall arrangement of the general type shown in Henry B. Babson and Chester A. Thomas Patent D. 137,590, dated April 4, 1944, Henry B. Babson and Jacob J. Stampen patent Re. 22,657, dated August 7, 1945, Henry B. Babson and Chester A. Thomas Patent 2,477,035, dated July 26, 1949, and Henry B. Babson and Chester A. Thomas Patent 2,564,047, dated August 14, 1951.

Figure 1:
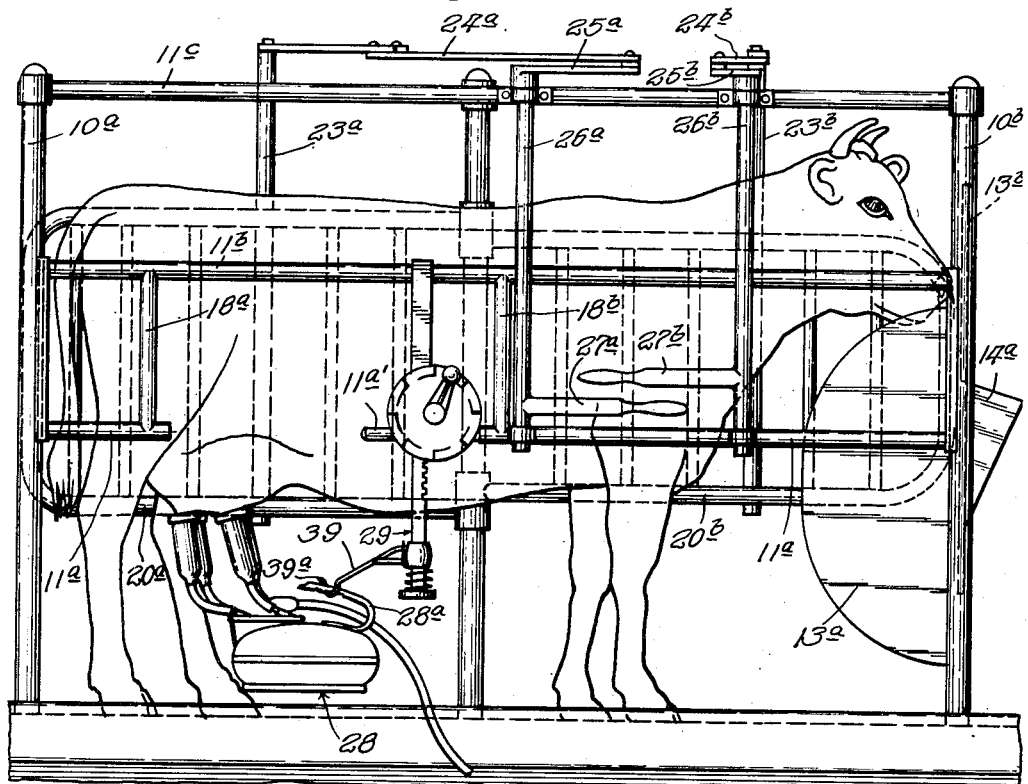
Figure 2:
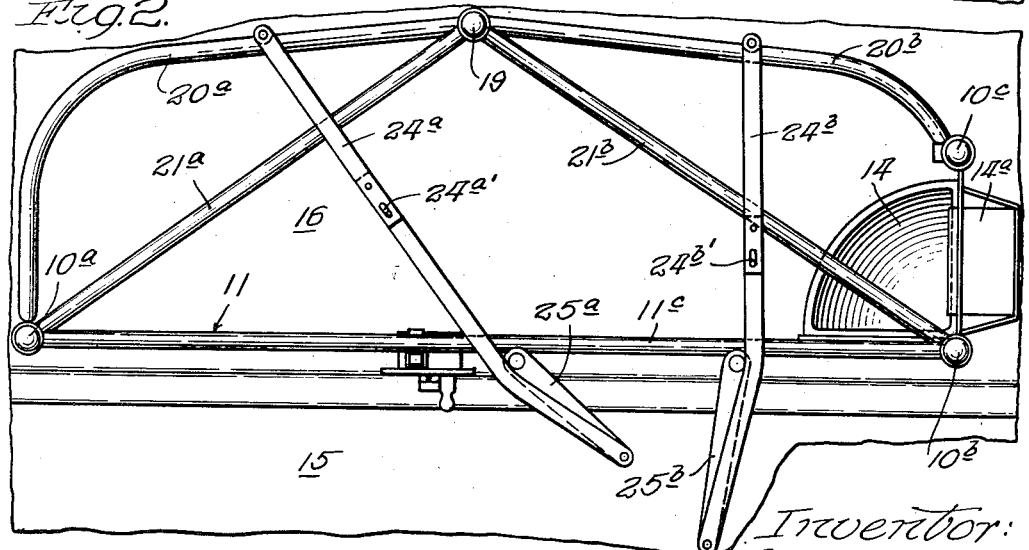
Figure 3:
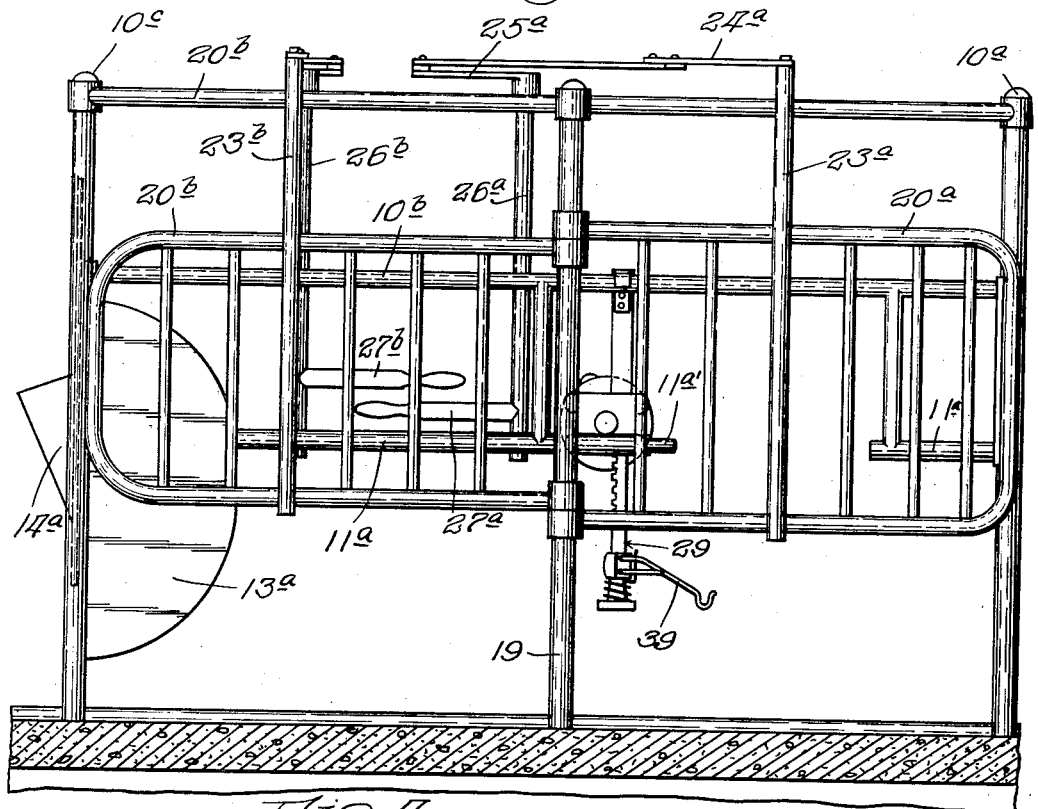
Figure 4:
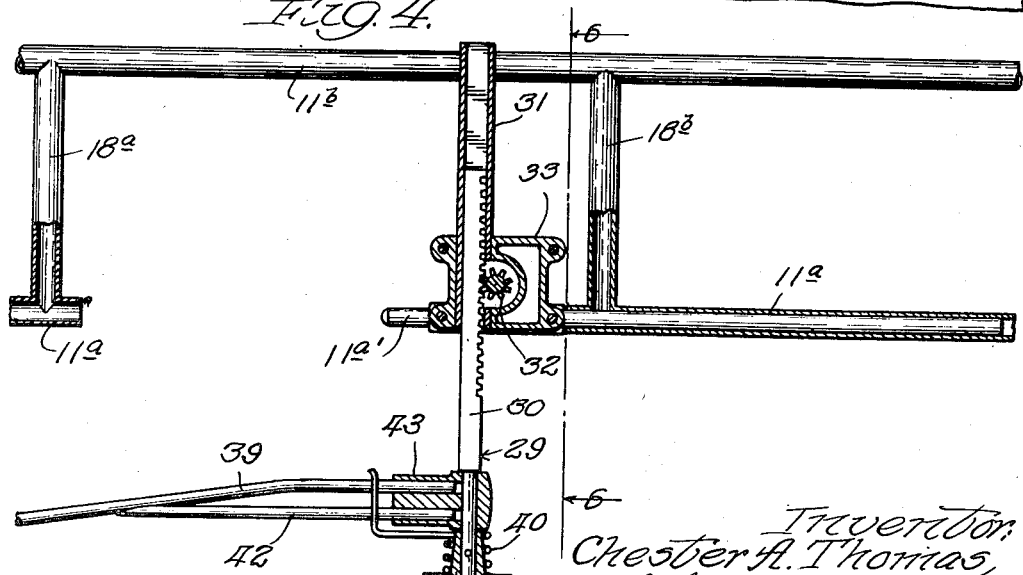
Figure 6:
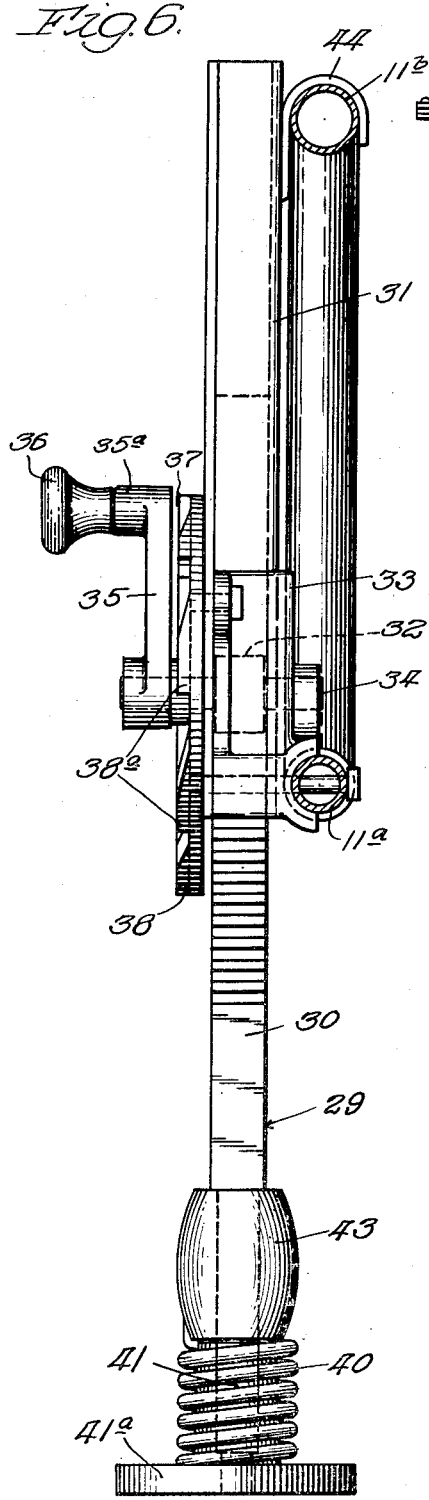
Figure 5:
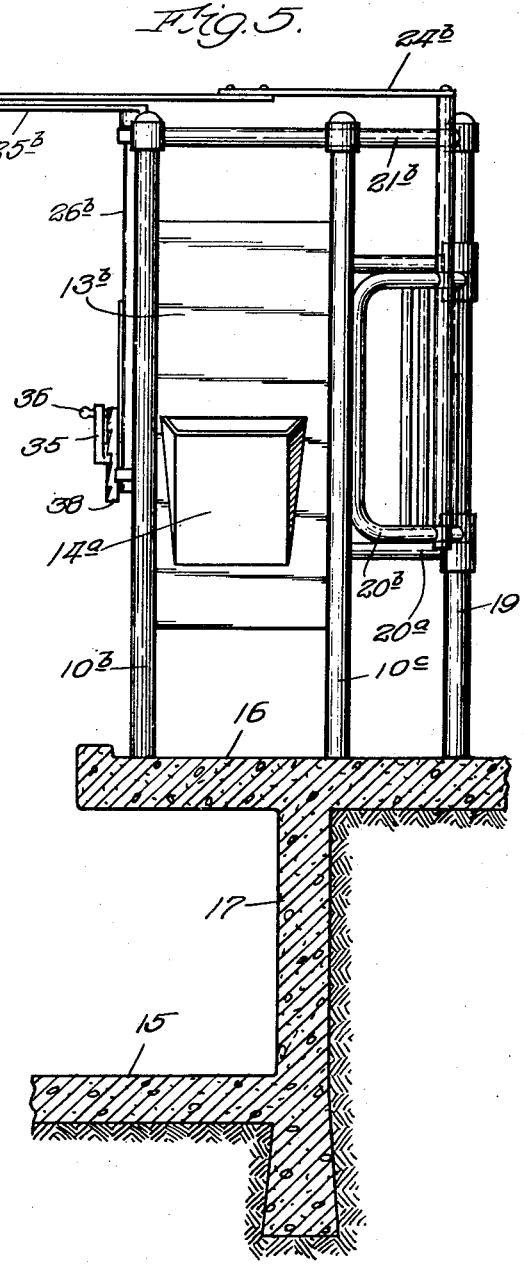

One feature of this invention is to provide an improved stall for housing a cow or other animal being milked, with the stall being constructed to provide ready access by the operator to the udder of the animal being milked; another feature of this invention is to provide such a stall wherein there is provided a support member for supporting a mechanical milker in operative relationship to an animal within the stall. Other features and advantages of the invention will become apparent from the following description of one embodiment of the invention taken in conjunction with the accompanying drawings, in which:

Fig. 1 is an elevational view from the operator's side of a stall embodying the invention, with a cow being indicated within the stall; Fig. 2 is a plan view of the stall of Fig. 1, but omitting the cow; Fig. 3 is an elevational view of the stall of Fig. 1 taken from the cow alley side or the side opposite to the elevation of Fig. 1; Fig. 4 is a fragmentary enlarged elevational view partly in cross section of a portion of the stall shown in Fig. 1, with the movable part thereof in open position; Fig. 5 is an end elevational view looking from the right-hand end of Fig. 1, but omitting the cow; and Fig. 6 is an enlarged substantially vertical sectional view taken substantially along line 6—6 of Fig. 4.

Modern dairies with herds of any appreciable size tend to employ milking parlors for the milking. Such a parlor includes a group of stalls each of which is intended to house an animal only during the milking period. These stalls are generally termed "parlor" stalls to distinguish them from the conventional stalls in an ordinary barn. Such a parlor is usually a separate room at one end of a dairy barn or a separate building adjacent the regular barn or barns. Instead of milking the cows successively while they remain in their regular stalls, the cows are freed from their regular stalls to walk to the milking parlor. The arrangement is generally such that there is a cow alley on one side of a row of parlor stalls and an operator's alley on the other side. The cows enter at one end of their alley, go into the parlor stalls, are milked and leave at the other end of the alley to return to their regular stalls in the dairy barn. Such an arrangement facilitates the highest degree of sanitation, prevents disturbance of the other cows and enables one operator to milk a larger number of cows in a shorter time and with less work.

The stall shown and described herein is particularly designed for use with a suspended milker of the type shown and described in McCornack Patent 1,859,213 of May 17, 1932, and in other issued patents. In the present invention, the stall includes a movable member located adjacent the rear of one side of the stall and adapted to extend substantially across an opening in this side. This movable member is movable longitudinally of the stall to provide access to an animal within the stall. In the preferred construction, a support member is mounted on the movable member for movement therewith and adapted to support a milker in operative relationship to an animal within the stall. In the preferred construction this support member is located in such a position on the movable member that when the movable member is moved to a position providing access to the udder of the animal, the support member is in position to support the mechanical milker adjacent to but forwardly of the udder.

In the embodiment of the invention shown in the accompanying drawings, each stall comprises a pair of corner posts 10a and 10b connected by longitudinal pipe members 11, shown in Fig. 1 as being pipe members 11a, 11b and 11c. Sheet metal splash panels 13a and 13b are provided at the front corner of the stall adjacent the corner post 10b. The splash panel 13b is located between the corner post 10b and a third post 10c that is spaced therefrom. A feed trough 14 is provided at the front of the stall between the splash panels 13a and 13b. Feed may be introduced to the trough through a chute 14a located on the opposite side of the panel 13b and providing a feed opening therethrough.

As may be best seen in Fig. 5, the floor of the operator's alley is a substantial distance beneath the floor 16 which supports the cow. These floors are connected by a vertical wall 17. The operator's floor 15 is preferably between 2½ and 3 feet below the level of the stall floor 16, with this stall floor normally being at the same level as the floor of the cow alley. The lowermost longitudinal member 11a is preferably at about the same height as the underside of the cow, as for example 2 feet 4 inches above the floor. The longitudinal member 11b is preferably higher than the normal height of the operator standing on the floor 15, as for example 1 foot 3 inches above the member 11a. The top longitudinal member 11c may be any convenient height slightly above the normal height of the cow, as for example 1 foot 6 inches above the member 11b. In a preferred construction, no vertical members extend to the floor from the longitudinal member 11a as this member is supported by its connection to the end posts 10a and 10b. The longitudinal member 11a is braced by upwardly extending pipe members 18a and 18b extending between the longitudinal members 11a and 11b. The members 11a and 11b, 18a and 18b, as shown in Fig. 1, define a substantially rectangular opening located adjacent the rear of the stall with the first pipe member 18a being to the rear of the udder of the animal within the stall and the second pipe member 18b being located forwardly of the udder and preferably located at approximately the center of the stall.

While a suspended milker does a very clean and complete milking job, the cows should be stripped briefly by hand before, and some cows after, the mechanical milking and this has heretofore involved considerable danger in milking parlors of conventional design. It is necessary to have the lowermost longitudinal member, as the member 11a, at about the height of the underside of the cow rather than adjacent the top of her head to prevent the cow accidentally falling out of the stall, kneeling and rolling out from under this longitudinal member and the like. Moreover, the cows sometimes shift over to the far side of the stall and make it difficult for an operator easily to reach the udder to strip the cow by hand. This has resulted in the operator frequently ducking down and sticking his head and shoulders under and up beyond the lowermost longitudinal member with his head extending between the member and the cow's body. If the cow surges back or kicks, with the operator in this position, a bad accident may result. The present arrangement provides a structure in which the cow is properly housed and yet completely obviates this danger by providing a movable part 11a' adapted to be moved out of the way to provide an opening adjacent the udder of the cow. This arrangement may be best seen in Figs. 1 and 4, with the movable part being shown in open position in these figures. This movable part 11a' is here shown as a rod adapted to be telescoped within the right-hand part of the pipe member 11a, as shown in Fig. 4. When the part is in such open position, an opening is provided bounded on the top by the pipe member 11b, on the sides by the vertical pipe members 18a and 18b and on the bottom by the stall floor 16. Since the longitudinal pipe member 11b is above the height of the operator when he is standing on the floor 15 (preferably from 6 to 6½ feet above such floor) and the vertical pipes 18a and 18b are substantially spaced from each other (preferably at least 2 feet), an opening is provided adjacent the udder which permits the operator to put his head and shoulders freely and safely within the stall since there is nothing to prevent his moving back and away quickly if a sudden movement of the cow makes this necessary.

The side of the stall facing the cow alley and opposite the operator's floor 15 is made somewhat bowed, as may be best seen in Fig. 2. At about the midpoint of the stall and on the cow alley side thereof, there is provided a hinge post 19 for rear and front gates 20a and 20b. The hinge post 19 is located a distance from the longitudinal members 11a, 11b and 11c that is greater than the thickness of the barrel of the cow. Each of the gates 20a and 20b extends inwardly when in closed position and is curved sharply inwardly near its free end, and is adapted to abut against one of posts 10a and 10c, respectively. As can be seen in Fig. 2, the free end portion of the rear gate 20a forms the rear end of the stall when the gate is closed. The free end portion of the front gate 20b forms a portion of the front end of the stall when the gate is in closed position. This arrangement provides a stall which is a snug fit with respect to the normal width of a cow, while maintaining a high degree of freedom of entrance and exit of the cow. This arrangement is important in that it minimizes side movement of the cow during the milking. The shape of the rear gate 20a makes it extremely easy for a cow to enter the stall when the gate is open as there is no obstruction at this rear end of the stall. The particular location of the hinge post 19 is also important as it is so placed as to bear against the left side of the cow as she enters the stall and causes her to swing her body around and line it up properly in the stall as she reaches for the feed in the trough 14.

The upper end of hinge post 19 is connected by overhead bracing members 21a and 21b with corner posts 10a and 10b, respectively, as shown, described and claimed in Henry B. Babson and Chester A. Thomas Patent 2,564,047. Upwardly extending pipe or rod members 23a and 23b are mounted on and swingable with the gates 20a and 20b, respectively. The upper ends of these members are connected to links 24a and 24b, respectively, which are in turn connected to operating levers 25a and 25b. The operating lever 25a is mounted at the top of a pipe or rod member 26a, while the lever 25b is mounted on the top of a similar member 26b. Each of these members 26a and 26b is rotatably mounted on the bottom and top longitudinal members 11a and 11c. Each of the members 26a and 26b may be rotated by handle members 27a and 27b attached to the rotatable members 26a and 26b, respectively. As may be seen in Fig. 2, there is a toggle action of the parts in closed position which locks the gates closed and prevents their being accidentally opened by movement of the cow. Adjustment of such toggle action to a desired locking force is effected by longitudinal adjustments 24a' and 24b' in the links 24a and 24b.

In order to support a mechanical milker 28 in operative relationship to the udder of the cow within the stall, there is provided a support member 29 mounted on the movable part or rod 11a'. This support member 29 is of the type shown and described and claimed in Henry B. Babson and Jacob J. Stampen patent Re. 22,368, dated August 24, 1943. This support member comprises a rack 30 slidably held in a housing 31, but extending below this housing. This rack is engaged by a pinion 32 located in a housing 33. The housing 33 is connected to the bottom end of the housing 31 so that the rack 30 within the housing is engaged by the pinion 32. The pinion is mounted on a rotatable axle 34 that extends through the housing 33 with the axle being rotated by an arm 35 fastened thereto having the outer end thereof provided with a hand knob 36. This hand knob is mounted on the outer end of a plunger 37, which is located at the outer end of the arm 35 and extends transversely thereof. The plunger 37 is urged to the right, as viewed in Fig. 6, by the operation of a compression spring (not shown) that is located within the thickened end portion 35a at the outer end of the arm 35. When the arm 35 is rotated by the operator, the axle 34 and pinion 32 are also rotated to raise and lower the vertical rack 30. The rack 30 is held in an adjusted position by engagement of the plunger 37 with a projection 38a on a circular ratchet 38. A series of these projections 38a are provided so that the plunger 37 may be held in engagement with any one of them. The adjacent end of the plunger 37 is disengaged from a particular projection by pulling outwardly on the knob 36.

Mounted on the bottom end of the vertically movable rack 30 is a resilient suspension means 39. This resilient suspension means 39 has an end portion 39a in the shape of a hook to engage the handle 28a of the mechanical milker 28. The resilient suspension means is urged forwardly by a holding means that is associated therewith. This forward urging of the suspension means provides a tug on the udder of the animal while it is being milked. The holding means is here shown as a coil spring 40 positioned around a bottom extension 41 extending beneath the rack 30. One end of the coil spring engages a cap 41a at the bottom of this extension 41, while the other end of the spring bears against the rear side of the suspension means 39 to urge it forwardly. As shown in Fig. 4, the resilient suspension means 39 is in the form of a resilient rod having a reinforcing rod 42 located at the inner end thereof. The suspension means 39 and the reinforcing rod 42 have their ends held in a block 43 which is located between the bottom of the rack 30 and the top of the bottom extension 41.

As can be seen in Figs. 1 and 4, the housing 33 is mounted adjacent to but short of the rear end of the movable rod 11a'. This location is preferred as it provides an arrangement in which as soon as the rod 11a' is moved forwardly, the udder of the animal is made accessible and the support member 29 is in the proper position to support the mechanical milker 28 in operative relationship to the udder of the cow. Further movement of the rod 11a' permits adjustment of the location of the support member.

In order to provide a more firm mounting for the support member 29, the housing 31 for the rack 30 is provided with a curved metal strap 44 adjacent the top thereof, with this curved strap extending around the top of the pipe member 11b, as is shown in Fig. 6. With this arrangement the top of the support member is firmly anchored to the pipe member 11b. When the movable rod 11a' is moved back and forth, the strap member 44 slides on the pipe member 11b. This arrangement gives firm support to the support member yet permits easy manipulation of the movable pipe 11a' and the attached support member.

While I have shown and described one embodiment of my invention, it is to be understood that it is capable of many modifications. Changes, therefore, in the construction and arrangement may be made without departing from the spirit and scope of the invention as disclosed in the accompanying claims.

I claim:

1. In a milking parlor arrangement of the character described including a first platform for supporting the operator, a second adjacent higher platform for supporting the animal and a stall on said higher platform for retaining the animal while it is being milked, structure comprising: a side portion forming a part of said stall located adjacent said first platform including a pair of spaced substantially horizontal members located above said first platform, said top one of said horizontal members being located above the head of an operator of normal height standing on said first platform, and a pair of spaced substantially vertical members adjacent the rear of the stall connecting said horizontal members to form a quadrangle, a movable portion forming a part of the bottom one of said horizontal members and located between said vertical members, said portion being longitudinally movable to provide access to the udder of an animal within said stall.

2. In a milking parlor arrangement of the character described including a first platform for supporting the operator, a second adjacent higher platform for supporting the animal and a stall on said higher platform for retaining the animal while it is being milked, structure comprising: a side portion forming a part of said stall located adjacent said first platform including a pair of spaced substantially horizontal pipe members located above said first platform, said top one of said horizontal pipe members being located above the head of an operator of normal height standing on said first platform, a pair of spaced substantially vertical members adjacent the rear of the stall connecting said horizontal pipe members to form a quadrangle, and a movable portion forming the part of the bottom one of said horizontal members that is between said vertical members, said movable portion being slidable within the adjacent portion of the bottom one of said horizontal pipe members to provide an opening for receiving the head and shoulders of the operator.

3. In a parlor stall of the character described for retaining an animal while it is being milked by a mechanical milker, structure including: a movable member extending longitudinally of the stall and located adjacent the rear of one side of said stall and adapted to extend substantially across an opening in said side, said member being movable longitudinally of said stall to provide access to an animal within said stall; and a support member mounted on said movable member and movable therewith for supporting a mechanical milker in operative relationship to an animal within said stall.

4. In a parlor stall of the character described for retaining an animal while it is being milked by a mechanical milker, structure including: a movable member located adjacent the rear of one side of said stall and adapted to extend substantially horizontally across an opening in said side, said member being movable longitudinally of said stall to provide access to an animal within said stall; and a support member mounted on said movable member for supporting a mechanical milker in operative relationship to an animal within said stall, said support member being mounted adjacent to the rear of said movable member for movement therewith so that access to the animal is provided through said opening when said milker is in said operative relationship.

5. In a parlor stall of the character described for retaining an animal while it is being milked by a mechanical milker, structure including: a movable member extending longitudinally of the stall and located adjacent the rear of one side of said stall and adapted to extend substantially across an opening in said side, said member being movable longitudinally of said stall to provide access to an animal within said stall; and a vertically adjustable support member mounted on said movable member and movable therewith for supporting a mechanical milker in operative relationship to an animal within said stall.

6. In a parlor stall of the character described for retaining an animal while it is being milked by a mechanical milker, structure including: a movable member located adjacent the rear of one side of said stall and adapted to extend substantially horizontally across an opening in said side, said member being movable longitudinally of said stall to provide access to an animal within said stall; a vertically adjustable support member mounted on said movable member; resilient suspension means mounted on said support member for rotation about a substantially vertical axis, said suspension means having a portion formed to carry a mechanical milker in operative relationship to an animal within said stall; and yielding means associated with said suspension means for urging the suspension means forwardly of said animal.

7. In a parlor stall of the character described for retaining an animal while it is being milked by a mechanical milker and including a side partition having a pair of spaced substantially horizontal members located above the bottom of the stall, the bottom one of said horizontal members being located adjacent the udder of an animal within the stall, a structure comprising: a longitudinally movable portion forming a part of the bottom one of said horizontal members to provide access to the udder of an animal within said stall; a support member mounted on said movable member adjacent the rear thereof for movement therewith so that when said movable member is moved forwardly to provide access to the udder the support member is forwardly of said udder; and resilient suspension means mounted on said support member and having a portion formed to carry a mechanical milker in operative relationship to said udder, said support member having one portion movably engaging the top one of said horizontal members.

8. In a parlor stall of the character described for retaining an animal while it is being milked by a mechanical milker and including a side partition having a pair of spaced substantially horizontal members located above the bottom of the stall, the bottom one of said horizontal members being located adjacent the udder of an animal within the stall, a structure comprising: a pair of spaced substantially vertical members adjacent the rear of the stall connecting said horizontal members to form a quadrangle; a movable portion forming a part of the bottom one of said horizontal members and located between said vertical members, said movable portion being longitudinally slidable forwardly with respect to the adjacent portion of said bottom horizontal member to provide access to the udder of an animal within said stall; a support member mounted on said movable member so that when said movable member is moved forwardly to provide said access the support member is adjacent to said udder; and resilient suspension means mounted on said support member and having a portion formed to carry a mechanical milker in operative relationship to said udder, said support member having one portion movably engaging the top one of said horizontal members.

9. In a parlor stall of the character described for retaining an animal while it is being milked by a mechanical milker and including a side partition having a pair of spaced substantially horizontal members located above the bottom of the stall, the bottom one of said horizontal members being located adjacent the udder of an animal within the stall, a structure comprising: a pair of spaced substantially vertical members adjacent the rear of the stall connecting said horizontal members to form a quadrangle; a movable portion forming a part of the bottom one of said horizontal members and located between said vertical members, said movable portion being longitudinally slidable forwardly with respect to the adjacent portion of said bottom horizontal member to provide access to the udder of an animal within said stall; a support member mounted on said movable member adjacent the rear thereof so that when said movable member is moved forwardly to provide said access the support member is adjacent to but forwardly of said udder; resilient suspension means mounted on said support member and having a portion formed to carry a mechanical milker in operative relationship to said udder, said support member having one portion movably engaging the top one of said horizontal members; and yielding means associated with said suspension means for urging the suspension means forwardly of said animal.

10. In a parlor stall of the character described for retaining an animal while it is being milked by a mechanical milker and including a side partition having a pair of spaced substantially horizontal members located above the bottom of the stall, the bottom one of said horizontal members being located adjacent the udder of an animal within the stall, a structure comprising: a pair of spaced substantially vertical members adjacent the rear of the stall connecting said horizontal members to form a quadrangle; a movable portion forming a part of the bottom one of said horizontal members and located between said vertical members, said movable portion being longitudinally slidable forwardly with respect to the adjacent portion of said bottom horizontal member to provide access to the udder of an animal within said stall; an adjustable support member mounted on said movable member adjacent the rear thereof so that when said movable member is moved forwardly to provide said access the support member is adjacent to and forwardly of said udder; resilient suspension means rotatably mounted on said support member for rotation about a substantially vertical axis and having a portion formed to carry a mechanical milker in operative relationship to said udder, said support member having one portion movably engaging the top one of said horizontal members; and yielding means associated with said suspension means for urging the suspension means forwardly of said animal.

11. A parlor stall of the character described for housing an animal while it is being milked including a side portion on the stall, said side portion comprising a pair of vertically spaced substantially horizontal pipe members, a pair of horizontally spaced substantially vertical pipe members connecting said horizontal members to form a substantially rectangular opening adjacent the udder of an animal within the stall, and a movable portion forming a part of the lower one of said horizontal pipe members between the vertical members and being movable to facilitate operations on said udder.

12. A parlor stall of the character described for housing an animal while it is being milked, including a side portion on the stall, said side portion comprising a pair of vertically spaced substantially horizontal members located above the bottom of the stall, the bottom one of said horizontal members being located adjacent the udder of an animal within the stall, a pair of horizontally spaced substantially vertical members adjacent the rear of the stall connecting said horizontal members to form a quadrangle, and a movable portion forming a part of the bottom one of said horizontal members and located between said vertical members, said portion being longitudinally slidable with respect to the adjacent portion of said bottom horizontal member to provide access to the udder of an animal within said stall.

References Cited in the file of this patent

UNITED STATES PATENTS

| Number | Name | Date |
|---|---|---|
| Re. 22,368 | Babson et al. | Aug. 24, 1943 |
| D. 90,482 | Ferris | Aug. 15, 1933 |
| 190,345 | Mann | May 1, 1877 |
| 210,938 | Hubbard | Dec. 17, 1878 |
| 502,829 | Phillips | Aug. 8, 1893 |
| 1,025,955 | Lummis | May 7, 1912 |
| 1,142,246 | Gagan | June 8, 1915 |
| 1,754,752 | Grim | Apr. 15, 1930 |
| 1,863,603 | Marshall, Jr. | June 21, 1932 |
| 1,934,177 | Ferris | Nov. 7, 1933 |
| 2,136,228 | Babson et al. | Nov. 8, 1938 |
| 2,198,048 | Babson et al. | Apr. 23, 1940 |
| 2,269,012 | Carli | Jan. 6, 1942 |
| 2,483,516 | Babson | Oct. 4, 1949 |
| 2,497,299 | Daily | Feb. 14, 1950 |
| 2,528,255 | Thomas | Oct. 31, 1950 |
| 2,564,047 | Babson et al. | Aug. 14, 1951 |

FOREIGN PATENTS

| Number | Country | Date |
|---|---|---|
| 438,432 | Great Britain | Nov. 18, 1935 |

OTHER REFERENCES

Starline, Inc., Milking Parlor Stall, 1 sheet, December 10, 1941.

Starline milking parlor stalls, 6 pages, January 21, 1933.